US 6,738,711 B2

(12) United States Patent
Ohmura et al.

(10) Patent No.: US 6,738,711 B2
(45) Date of Patent: May 18, 2004

(54) SYSTEM FOR DISTRIBUTING MAP INFORMATION AND THE LIKE

(75) Inventors: Hiroshi Ohmura, Hiroshima (JP); Shigefumi Hirabayashi, Hiroshima (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/920,307

(22) Filed: Aug. 2, 2001

(65) Prior Publication Data

US 2002/0077745 A1 Jun. 20, 2002

(30) Foreign Application Priority Data

Aug. 4, 2000 (JP) ........................................ 2000-236770

(51) Int. Cl.[7] .............................................. G01C 21/00
(52) U.S. Cl. ....................... 701/208; 701/209; 701/211; 701/200; 701/213
(58) Field of Search ................................. 701/200, 201, 701/207, 208, 211, 213, 214, 202, 204

(56) References Cited

U.S. PATENT DOCUMENTS

| | | | |
|---|---|---|---|
| 5,223,844 A | 6/1993 | Mansell et al. | |
| 5,987,381 A * | 11/1999 | Oshizawa | ................... 701/209 |
| 5,999,126 A | 12/1999 | Ito | |
| 6,052,645 A | 4/2000 | Harada | ........................ 701/212 |
| 6,115,667 A | 9/2000 | Nakamura | ................... 701/200 |
| 6,151,497 A * | 11/2000 | Yee et al. | .................... 455/430 |
| 6,208,935 B1 | 3/2001 | Yamada et al. | ............. 701/209 |
| 6,249,740 B1 * | 6/2001 | Ito et al. | ...................... 701/200 |
| 6,317,684 B1 * | 11/2001 | Roeseler et al. | ............ 701/202 |
| 6,324,467 B1 * | 11/2001 | Machii et al. | .............. 701/200 |
| 6,334,087 B1 * | 12/2001 | Nakano et al. | ............. 701/208 |
| 6,386,457 B1 * | 5/2002 | Sorie | .......................... 235/487 |

FOREIGN PATENT DOCUMENTS

| | | |
|---|---|---|
| EP | 0 995 973 A2 | 4/2000 |
| EP | 1 069 547 A1 | 1/2001 |
| JP | 09-090869 A | 4/1997 |
| JP | 11-38872 A | 2/1999 |
| JP | 11-051664 A | 2/1999 |
| JP | 11-101649 A | 4/1999 |
| JP | 11-132773 A | 5/1999 |
| JP | 11-184375 A | 7/1999 |
| JP | 11-281377 A | 10/1999 |
| JP | 11296074 A | 11/1999 |
| JP | 11-316541 A | 11/1999 |

* cited by examiner

*Primary Examiner*—Marthe Y. Marc-Coleman
(74) *Attorney, Agent, or Firm*—Nixon Peabody LLP; Donald R. Studebaker

(57) ABSTRACT

A map and other information distribution system for distributing map information and information other than map information is disclosed. The map and other information distribution system comprises an information center including a database storing map information and information other than map information, and a transmitter for transmitting at least said map information under a fee-based navigation contract concluded beforehand, and a mobile navigation system including a location detector for detecting the present location of a mobile unit, a receiver for receiving at least the map information from the information center under the fee-based navigation contract concluded beforehand, and a controller for displaying the map information around the present location of the mobile unit on a display device.

17 Claims, 14 Drawing Sheets

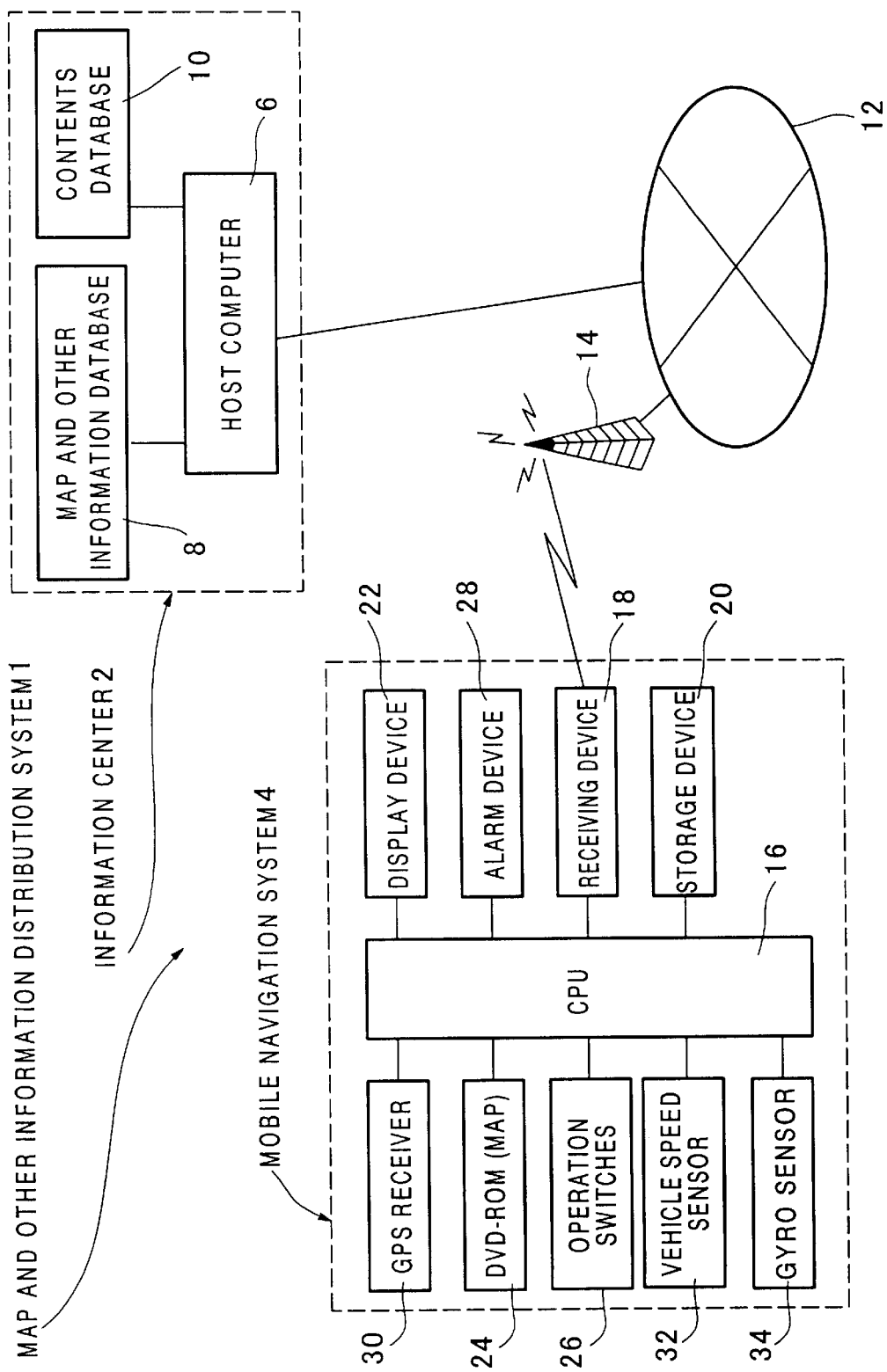

FIG. 2

INFORMATION CONTRACT FORM

①NAVI ☐ YES ☐ NO
DELIVERY MAP INFORMATION FOR NAVI SERVICE
• INITIAL PURCHASE FEE OF $150 (NOT INCLUDING CELLULAR PHONE FEE)
• MONTHLY FEE OF $50 (CHANGES BASED ON OPTIONAL ITEMS)
<OPTIONAL ITEMS>
• ADVERTISEMENT INFORMATION DELIVERY ☐ YES ☐ NO
  (ITEMS)
  ☐ RESTAURANT ADVERTISEMENTS ▼ $5
  ☐ CAR DEALER ADVERTISEMENTS ▼ $1/ONE DEALER
  (······, MAZDA, ··········)
  ☐ DEPARTMENT STORE ADVERTISEMENTS ▼$3
  ☐ SPORTING GOODS SHOP ADVERTISEMENTS ▼ $1
  ☐ ELECTRIC APPLIANCE AND PC ADVERTISEMENTS ▼$2
  ☐ LEISURE FACILITY ADVERTISEMENTS ▼ $4
  ☐ HOTEL AND ACCOMMODATION ADVERTISEMENTS ▼ $3
  (DELIVERY TIME)
  ☐ FULL TIME +0
  ☐ SATURDAY/SUNDAY/HOLIDAY +35%
  ☐ APPOINTED TIME PERIOD +10%
  (ADVERTISEMENT DELIVERY METHOD)
  ☐ ICON & MESSAGE ▼−
  ☐ SUPERIMPOSED WHEN VEHICLE APPROACHES ADVERTISER LOCATION ▼5%
  ☐ CM AT NAVI STARTING TIME ▼5%
  ☐ VOICE ANNOUNCEMENT ▼10%
  (DELIVERY TIME)
  ☐ MORE THAN 10 HOURS PER WEEK
    MONTHLY CHARGE $25 (PENALTY $1 PER HOUR SHORT)

②MUSIC CONTRACT ☐ YES ☐ NO
DELIVERY OF FAVORITE MUSIC
    MONTHLY FEE $5 (ADDITIONAL FEE FOR EVERY DELIVERY)
③KARAOKE CONTRACT ☐ YES ☐ NO
ONLINE KARAOKE SERVICE
    MONTHLY FEE $5 (ADDITIONAL FEE FOR EVERY KARAOKE DELIVERY)
④VIDEO CONTRACT ☐ YES ☐ NO
DELIVERY OF FAVORITE VIDEO MOVIES
    MONTHLY FEE $5 (ADDITIONAL FOR EVERY VIDEO MOVIE DELIVERY)
⑤VIDEO PHONE ☐ YES ☐ NO
VIDEO PHONE SERVICE
    MONTHLY FEE $3
⑥PERSONAL SCHEDULE MANAGEMENT CONTRACT ☐ YES ☐ NO
DIGITAL SECRETARY SERVICE
    MONTHLY FEE $1
⑦INTERNET & E-MAIL CONTRACT ☐ YES ☐ NO
ENABLE INTERNET ACCESS AND E-MAIL
    MONTHLY FEE $5
⑧VEHICLE TROUBLESHOOTING CONTRACT ☐ YES ☐ NO
REMOTE VEHICLE TROUBLESHOOTING SERVICE
    MONTHLY FEE $10
⑨PERIODIC INSPECTION/CONSUMABLE PARTS REPORT CONTRACT ☐ YES ☐ NO
REPORT ON TIME FOR PERIODIC INSPECTION AND REPLACEMENT OF EXPENDABLE PARTS
    MONTHLY FEE $0 (INTERNET & E-MAIL CONTRACT REQUIRED)

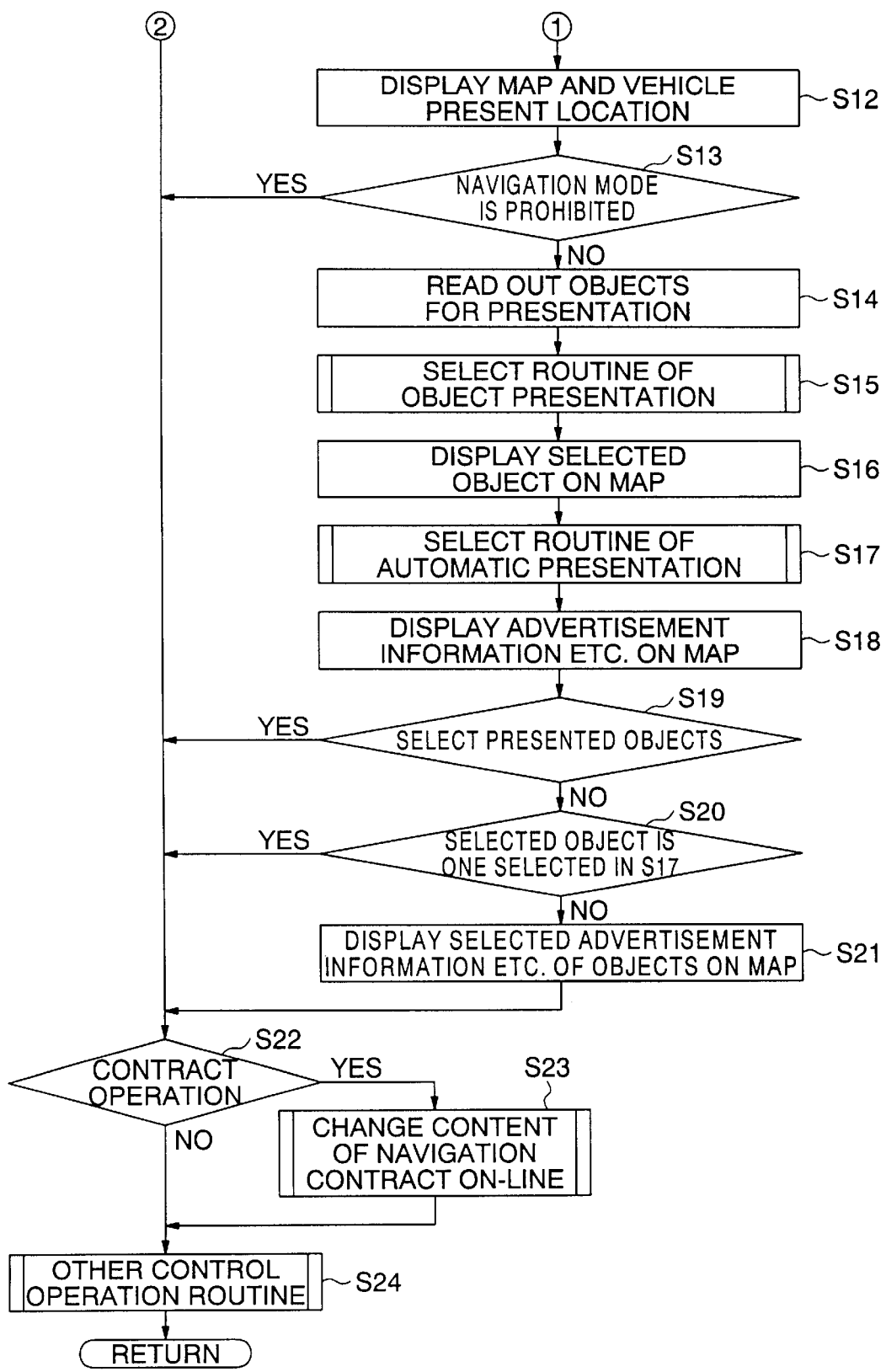

SYSTEM FOR DISTRIBUTING MAP INFORMATION AND THE LIKE

BACKGROUND OF THE INVENTION

1. Field of the Invention

The present invention relates to a system for distributing map information and the like, and in particular to a system in which an information center distributes map information and the like to mobile communication devices such as vehicle navigation systems.

2. Description of the Related Art

There is conventionally known a vehicle navigation system that navigates a motor vehicle to its destination utilizing map information consisting of a displayed map covering the vicinity of the present location of the motor vehicle.

The conventional navigation system is equipped with a storage medium such as a DVD-ROM or a CD-ROM for storing map information, reads out necessary map information from the storage medium, and navigates the motor vehicle.

However, since the map information requires use of a large capacity storage medium, the volume of the stored information should preferably be reduced. Further, when the map information has become old, the old information can not be used to navigate the vehicle accurately. Recently, it has been proposed that an information center equipped with a database storing updated map information, sightseeing information and the like be provided so that individual motor vehicles can receive and utilize the information.

Conventional vehicle navigation systems using map information sent from an information center are for example disclosed in Japanese Patent Unexamined Publications No. 9-90869, No. 11-316541, No. 11-132773, No. 11-38872, No. 11-51664, 11-184372, 11-101649 and No. 11-281377.

Japanese Patent Unexamined Publication No. 9-90869 discloses a map and other information providing system that provides a motor vehicle with map data including updated road and traffic information.

Japanese Patent Unexamined Publication No. 11-316541 discloses a map-based system for providing motor vehicles with information regarding a virtual space, which alters the road options and supplied information according to the user's preferences and the time zone.

Japanese Patent Unexamined Publication No. 11-132773 discloses a map data providing system whose transmission processing load can be reduced when a plurality of mobile terminals of motor vehicles request map data.

Japanese Patent Unexamined Publication No. 11-38872 discloses a map data receiving system that can receive a timely and useful detailed map.

Japanese Patent Unexamined Publication No. 11-51664 discloses a road information providing system that transmits road information to a motor vehicle when the road information satisfies prescribed distribution conditions.

Japanese Patent Unexamined Publication No. 11-184375 discloses a digital map data processing apparatus that can obtain accurate road map data on easily and frequently obtainable data and uses them effectively.

Japanese Patent Unexamined Publication No. 11-101649 discloses a navigation system that can accurately and effectively navigate a driver to a destination using both routes recommended by an information center and driver-determined routes.

Japanese Patent Unexamined Publication No. 11-281377 discloses a vehicle navigation system that can simply navigate a vehicle using a map and easily update the map.

However, none of the above-mentioned Patent Publications discloses any features of the present invention. Specifically, none discloses or suggests that map information and the like are distributed under a fee-based navigation contract, that information other than map information such as advertisements and the like can be optionally selected, or that the fee can be varied based on the optionally selected items.

SUMMARY OF THE INVENTION

It is therefore an object of the present invention to provide a system for distributing map information and the like that can reduce both the required processing capability of an information center and the cost of a mobile navigation system.

It is a further object of the present invention to provide a system for distributing map information and the like that enables an information center to secure funds by making fee-based contracts.

It is further an object of the present invention to provide an information providing system, a mobile navigation system and a computer readable storage medium.

The above object s are achieved according to the present invention by providing a map and other information distribution system for distributing map information and information other than map information, comprising an information center including a database storing map information and information other than map information, and a transmitter for transmitting at least said map information under a fee-based navigation contract concluded beforehand, and a mobile navigation system including a location detector for detecting a present location of a mobile unit, a receiver for receiving at least the map information from the information center under the fee-based navigation contract concluded beforehand, and a controller for displaying the map information around the present location of the mobile unit on a display device.

In a preferred embodiment of the present invention, the information other than map information includes various items, and the various items of information other than map information can be selected in the navigation contract for delivery from the information center to the navigation system, and the fee specified in the navigation contract is changed based on the selected items of information other than map information.

The above objects are also achieved according to the present invention by providing an information providing system, for transmitting map information and information other than map information to a mobile navigation system comprising a database storing map information and information other than map information, and a transmitter for transmitting at least said map information to the mobile navigation system under a fee-based navigation contract concluded beforehand.

In a preferred embodiment of the present invention, the information other than map information includes various items, and the various items of information other than map information can be selected in the navigation contract for delivery from the information center to the navigation system, and the fee specified in the navigation contract is changed based on the selected items of information other than map information.

The above objects are also achieved according to the present invention by providing a mobile navigation system comprising a location detector for detecting a present location of a mobile unit, a receiver for receiving at least map information from a remote information center under a navigation contract concluded beforehand, and a controller for displaying the map information around the present location of the mobile unit on a display device.

In a preferred embodiment of the present invention, the receiver further receives information other than map information that includes various items, and the various items of information other than map information can be selected in the navigation contract for delivery from the information center to the navigation system, and the fee specified in the navigation contract is changed based on the selected items of information other than map information.

In a preferred embodiment of the present invention, the system further comprises a map storage device for storing map information, and said controller displays the map information stored in the map storage device when the map information is not received from the information center.

In a preferred embodiment of the present invention, the receiver receives the map information from the information center when setting the destination of a motor vehicle or requesting the map information.

In a preferred embodiment of the present invention, even when the receiver receives the map information from the information center, said controller does not update the map information stored in the map storage device.

In a preferred embodiment of the present invention, when the receiver can not receive the map information from the information center, said controller gives an alarm indicating no reception of information and displays the map information stored in the map storage device.

In a preferred embodiment of the present invention, the controller stores the map information or coordinates of a location of the map information received from the information center in the map storage device, and displays the stored map information on the display device or displays other map information freshly received from the information center based on the coordinates of the location of the map information on the display device.

In a preferred embodiment of the present invention, the system further comprises a connecting device for connecting with a communication network, and when the mobile navigation system is connected with the information center through the communication network the controller enables conclusion of a navigation contract or change in the selection of various items of information other than map information.

The above objects are also achieved according to the present invention by providing a computer readable storage medium having a navigation program stored thereon representing instructions executable by a mobile navigation system that receives map information from an information center, the computer readable storage medium comprising instructions for detecting a present location of a motor vehicle, instructions for receiving at least the map information from a remote information center under a fee-based navigation contract concluded beforehand, and instructions for showing the map information around the present location of the motor vehicle on a display device.

In a preferred embodiment of the present invention, the computer readable storage medium further comprises instructions for further receiving information other than map information that includes various items, and the various items of information other than map information can be selected in the navigation contract for delivery from the information center to the navigation system, and the fee specified in the navigation contract is changed based on the selected items of information other than map information.

The above objects are also achieved according to the present invention by providing a navigation program representing instructions executable by a mobile navigation system that receives map information from an information center, the navigation program comprising instructions for detecting a present location of a motor vehicle, instructions for receiving at least the map information from a remote information center under a fee-based navigation contract concluded beforehand, and instructions for showing the map information around the present location of the motor vehicle on a display device.

In a preferred embodiment of the present invention, the navigation program further comprises instructions for further receiving information other than map information that includes various items, and the various items of information other than map information can be selected in the navigation contract for delivery from the information center to the navigation system, and the fee specified in the navigation contract is changed based on the selected items of information other than map information.

The above and other objects and features of the present invention will be apparent from the following description made with reference to the accompanying drawings showing preferred embodiments of the present invention.

BRIEF DESCRIPTION OF THE DRAWINGS

In the accompanying drawings:

FIG. 1 is an overall perspective view of a map distribution system, a map and other information providing system and a mobile navigation system according to an embodiment of the present invention;

FIG. 2 is an example of an information center contract form according to the embodiment of the present invention;

FIGS. 4A and 4B are flowcharts showing the sequence of control operations of the mobile navigation system according to the embodiment of the present invention;

DETAILED DESCRIPTION OF THE PREFERRED EMBODIMENTS

Figure 3:
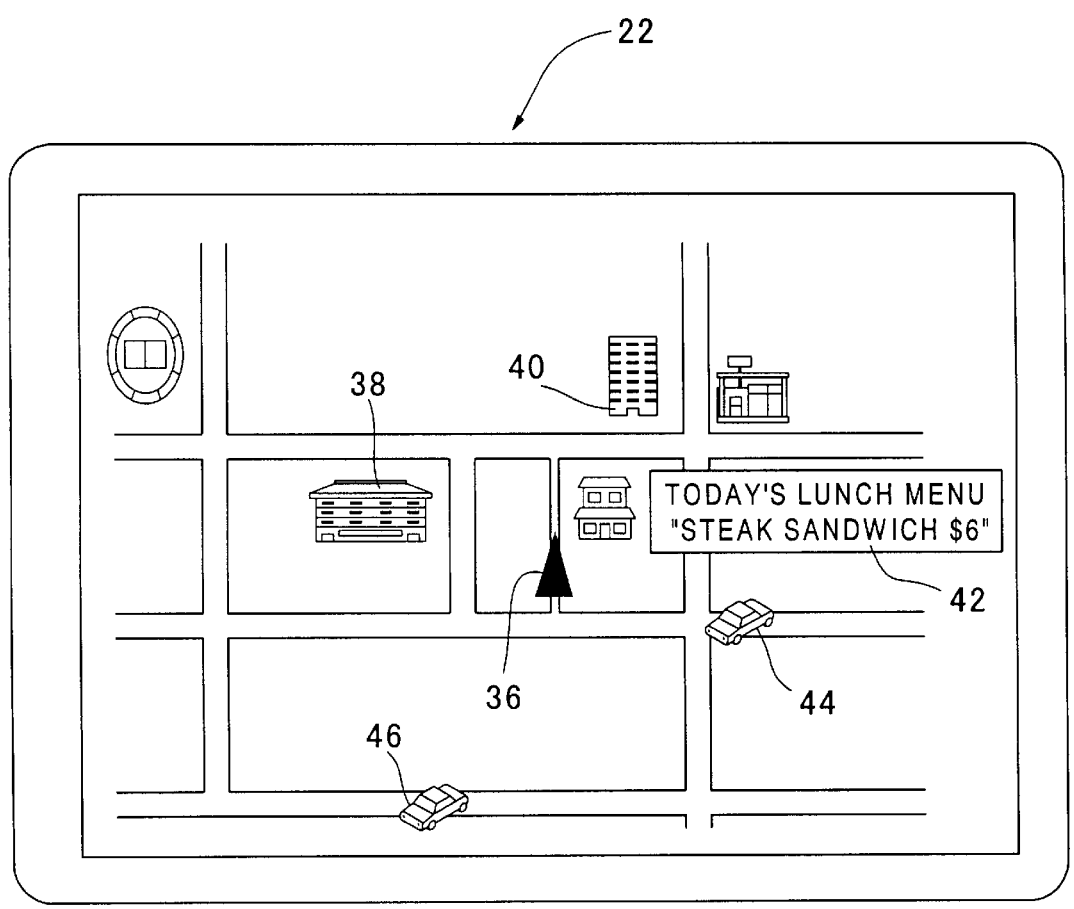
FIG. 3 is an example of the screen displayed on a display device of the mobile navigation system according to the embodiment of the present invention.

Preferred embodiments of the present invention will now be explained with reference to the drawings.

A first embodiment of the present invention will be explained with reference to FIGS. 1 through 14.

FIG. 1 shows a map distribution system including a system for distributing map information etc. and a mobile navigation system according to a preferred embodiment of the present invention.

Referring to FIG. 1, a map and other information distribution system 1 comprises an information center 2 and a mobile navigation system 4. The information center 2 works as a map and other information providing system, and the mobile navigation system 4 receives map information and information other than map information (advertisement information and the like) and various contents from the information center 2.

The information center 2 is provided with a host computer 6, a map and other information database 8 storing map information, information other than map information (advertisement information and the like) and homepage information on various objects, and a content database 10 storing various contents. The host computer 6 is connected with the Internet 12 and works as a server. The map information stored in the map and other information database 8 includes map data, road information, advertisement information and the like. The road information includes traffic regulatory information such as intersections, one-way traffic signs, and no-right-turn and no-left-turn signs. The road information is displayed on the map data. The content database 10 includes information regarding music, karaokes, videos, television telephones, personal schedules, Internet and e-mails, vehicle troubleshooting and periodic inspections, and expendable part reports, all of which will be explained below.

Communication stations 14 installed in different areas are connected with the Internet 12. The information center 2 transmits information regarding map information, information other than map information and various contents through the communication stations 14 to the mobile navigation system 4 of the motor vehicle. Communication networks other than the Internet 12 may be utilized in the present invention.

The mobile navigation system 4 is provided with a CPU 16 and a receiving device 18 such as a cellular phone. The CPU 16 navigates a motor vehicle to its destination based on input data and the operations of a driver. The receiving device 18 receives map information, information other than map information and various contents from the information center 2 through the Internet 12 and the communication station(s) 14. The mobile navigation system 4 is further provided with a storage device 20, a hard disk drive (HDD) for storing the received map information and the like, a display device 22 for displaying the map information and the like received from the information center 2, a DVD-ROM 24 for storing detailed map information and/or simple map information, an operation switch 26 for setting a destination and requesting the map information and the like to the information center 2, and an alarm device 28 for alerting the driver when the system 4 was unable to receive the map information and the like.

The mobile navigation system 4 is still further provided with a GPS receiver 30 for detecting the present location of a motor vehicle, a vehicle speed sensor 32 and a gyro sensor 34. The GPS receiver 30 receives a radio wave from a satellite to detect the present location of a motor vehicle, the vehicle speed sensor 32 detects the vehicle speed so as to obtain the traveling distance of the vehicle, and the gyro sensor 34 detects the traveling direction of the vehicle. The present location of the vehicle can be accurately obtained based on the detection values of the sensors 30, 32 and 34.

In order to enable the mobile navigation system 4 to receive the map information, the information other than map information and the various contents from the information center 2, a fee-based navigation contract needs to be concluded between the information center 2 and the driver or owner of the motor vehicle. The navigation contract is normally concluded in writing at a car dealer when the driver purchases the motor vehicle. However, the driver may conclude a fee-based navigation contract with the information center 2 through the Internet 12 using the mobile navigation system 4 when or after purchasing the motor vehicle. Further, the driver may conclude a fee-based navigation contract with the information center 2 through the Internet 12 using a home computer after purchasing the motor vehicle. FIG. 2 is an example of an information center contract form. Contents of the contract will be explained with reference to FIG. 2. The information center contract basically includes two sections: (1) a navigation or NAVI contract and (2)–(9) other contracts such as a music delivery contact and the like.

First, the NAVI contract will be explained. The NAVI contract covers the delivery of map information to the mobile navigation system 4 (basic contract) and the delivery of advertisement information to the system 4 (optional contract).

The NAVI contract includes an initial purchase fee of $150 for the navigation system and a monthly fee of $50 that is changed based on optionally selected items.

Next, when optional contracts are made, the following various items may be selected and the monthly fee of $50 will be changed. Namely, when a contract is concluded for delivery of "Advertisement Information" and then one or more of "Restaurant Advertisements," "Car Dealer Advertisements," "Department Store Advertisements," "Sporting Goods Shop Advertisements," "Electric Appliance and PC Advertisements," "Leisure Facility Advertisements" and "of Hotel and Accommodation Advertisements" are selected, the monthly fee of $50 is reduced. For example, when the "Restaurant Advertisements" is selected $5 is deducted from the monthly fee of $50 Similarly, when other items are selected, amounts of money corresponding to the items in FIG. 2 are deducted from the monthly fee of $50.

Next, when one or more optional contacts are made and "Full Time Delivery," which provides information delivery from the information center 2 on a full-time basis, is further selected, the monthly fee remains unchanged from that after the deductions made based on the optionally selected items. However, when "Saturday, Sunday and Holiday Delivery," which provides information delivery from the information center 2 only on Saturdays, Sundays and holidays, is further selected, the monthly fee is increased 35%. Further, when "Appointed Time Period 10 a.m.–5 p.m.," which provides information delivery only from the appointed time period of 10 a.m. to 5 p.m., the monthly fee is increased 10%.

Further, when "Icon & Message," which uses icons and messages for display regarding the distribution of "Advertisement Information," is further selected, the monthly fee remains unchanged from that after the amounts deducted based on the optionally selected items. When "Superimposed When Vehicle Approaches Advertiser Location," which displays superimposed information when the motor vehicle approaches an object related to a selected item, is further selected, the monthly fee is reduced 5%. When "CMNAVI at Starting Time," which displays objects related to the selected items when the navigation system is started, is further selected, the monthly fee is further reduced 5%. When "Voice," which provides information about objects related to the selected items by a voice announcement, is further selected, the monthly fee is still further reduced 10%.

When a contract is concluded for delivery of "Advertisement Information" and for "More Than 10 Hours Delivery per Week" is further selected, the monthly fee of $50 is reduced 50% to $25. As a result, the driver is likely to positively view the advertisement information. However, if the driver does not use the navigation system for 10 or more hours a week, a penalty of $1 per hour under ten hours is added to the reduced monthly fee of $25.

Accordingly, by concluding NAVI contracts the information center 2 can considerably defray the initial cost of the navigation system 4 (the above-mentioned $150) and further secure operating funds in the form of the monthly contract fees, which increase in proportion to the number of contracts with customers.

Further, since the customers (drivers) can select the distributed advertisement types based on their preferences, advertisements of no interest to the drivers are not displayed on the navigation system. Since only necessary advertisement information is distributed, the drivers can effectively utilize the advertisement information and can further reduce the monthly fee of the NAVI contract. Regarding this, although the monthly fees are reduced when customers make optional contracts, the information center 2 can collect advertising fees from the companies that place the advertisements and, therefore, can secure a much greater amount of operating funds in total from the customers (drivers) and advertisers in combination. Thus, the information center 2 can also secure sufficient operating funds from this aspect.

When the delivery time is limited the monthly fee increases but the customers (drivers) can use the navigation system 4 according to their lifestyles. The advertisers are charged higher advertising fees when the customers select full time delivery. When limited day or time delivery is selected, the advertisers are charged lower advertising fees while the customers (drivers) are charged higher monthly fees. Overall, therefore, the information center 2 can secure a satisfactory amount of income.

Further, when a contract is concluded for "More Than 10 Hours Delivery per Week" based on the distribution of "Advertisement Information," the monthly fee is considerably reduced. The drivers are therefore likely to positively view the advertisement information displayed on the navigation system. On the other hand, when the navigation system is not used for at least the predetermined number of hours a week (10 hours), the drivers have to pay penalties. The monthly fees from the drivers therefore increase. Further, the information center can charge advertisers relatively high advertising fees on the basis of driver use of at least the predetermined number hours a week.

Next, the information center contract other than the NAVI contract will be explained with reference to FIG. 2. The information center contract further includes a "Music Contract," a "Karaoke Contract," a "VIDEO Contract," a "Videophone Contract," a "Personal Schedule Management Contract," an "Internet & E-Mail Contract," a "Vehicle Troubleshooting Contract, " and a "Periodic Inspection/ Expendable Parts Report Contract". The customers (drivers) may select some of such contracts based on their preferences and needs.

When making these contracts other than the NAVI contract, additional monthly fees need to be paid in addition to the monthly fee of $50 for the NAVI contract. The contents of these contracts are stored in the content database 10 of the information center 2.

The respective customers (drivers) may enjoy the various contents based on their preferences and needs by paying the additional monthly fees. The information center 2 can secure further operating funds by obtaining the additional monthly fees.

FIG. 3 is an example of the screen shown on the display device 22 of the mobile navigation system 4. The display on the display device 22 includes a mark 36 indicating the present location of the driver's motor vehicle, a symbol 38 indicating the ABC Hotel under the "Hotel and Accommodation Advertisements" contract, a symbol 40 indicating a car dealer under the "Car Dealer Advertisement" contract, a superimposed ad 42 of a restaurant under the "Superimposed Announcement" contract, and marks 44 and 46 indicating the present locations of Mr. A's motor vehicle and Mr. B's motor vehicle, which are provided to enable communication with the driver's motor vehicle. This will be explained below.

Next, the control operations of the CPU 16 of the mobile navigation system 4 and the host computer 6 of the information center 2 will be explained with reference to FIGS. 4–14. Reference symbols S and T in FIGS. 4A and 4B and 14 indicate steps of the control operations.

The control operation of the CPU 16 of the mobile navigation system 4 will be explained with reference to FIGS. 4A and 4B. It is determined in S1 whether or not the driver has set a navigation mode by operating the switch 26. If YES in S1, the procedure goes to S2 in which the advertisement information is displayed on the display device 22 for a predetermined time period at the starting time of the navigation system 4 when the "CM at NAVI Starting Time" is selected in the navigation contract. The advertisement information was received previously from the information center 2 and stored in the storage device 20. The advertisement information may be received through the Internet 12 from the information center 2 at the starting time of the navigation system 4.

The procedure next goes to S3 in which the present location of the motor vehicle is detected using the GPS receiver 30, the vehicle speed sensor 32, the gyro sensor 34, map-matching and the like.

Next, it is determined in S4 whether or not it is just after the navigation mode was set. If YES in S4, the procedure goes to S5 and S6. If the motor vehicle has moved a predetermined distance (S5) or a predetermined number of cycles has passed (S6), the procedure goes to S7. In S7, the navigation system 4 transmits a request signal including the vehicle present location information together with information regarding the navigation system 4 use time to the information center 2.

Next, it is determined in S8 whether or not it is just after the driver set his destination. If YES in S8, the procedure goes to S9 in which the navigation system 4 transmits a request signal including the destination information and the vehicle present location information together with information regarding the navigation system 4 use time to the information center 2.

Next, it is determined in S10 whether or not the navigation system 4 has received a response signal from the information center 2. If YES in S10, the procedure goes to S11 in which the navigation system 4 temporarily stores the response signal in the storage device 20. The response signal includes map information, navigation information, object information, advertisement information and homepage information. These temporarily stored information items will thereafter be updated. Thus, the driver may use this updated information without further receiving new information from the information center 2. Alternatively, the navigation system 4 may be programmed to delete the temporarily stored information after a predetermined time (for example one day) has passed, without updating the information. Since the information is not updated, the load on the storage device 20 of the navigation system 4 can be reduced, and the information center 2 benefits from the fact that the navigation contract is more likely to be continued.

After S11, the procedure goes to S12 in which the navigation system 4 reads a map, of specified scale, of the area around the vehicle present location from the storage device 20, and displays both the map and the mark 36 showing the vehicle present location on the display device 22. On the other hand, when it is determined that the navigation system 4 did not receive a response signal, that is, that the communication was interrupted, the procedure goes to S12. In S12, the information indicating response signal receive failure is shown and then the map previously stored in the storage device 20 is shown on the display device 22. Instead of the stored map, the map information stored in the DVD-ROM 24 can be displayed on the display device 22.

Next, it is determined in S13 whether or not the navigation mode is prohibited by the operation switch 26. If the navigation mode is found not to be prohibited in S13, the procedure goes to S14 in which the navigation system 4 reads out the objects to be automatically presented (displayed) among the selected items from the temporarily stored information or the updated stored information in the storage device 2 based on the advertisement information specified in the contract beforehand.

Figure 5:
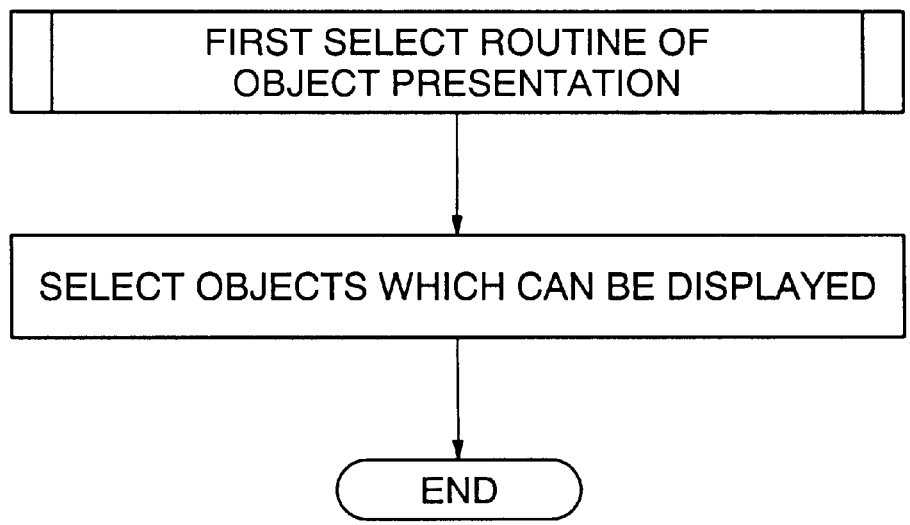
FIG. 5 is a flowchart showing a first select routine of the object presentation in S15 of FIG. 4B.
Figure 6:
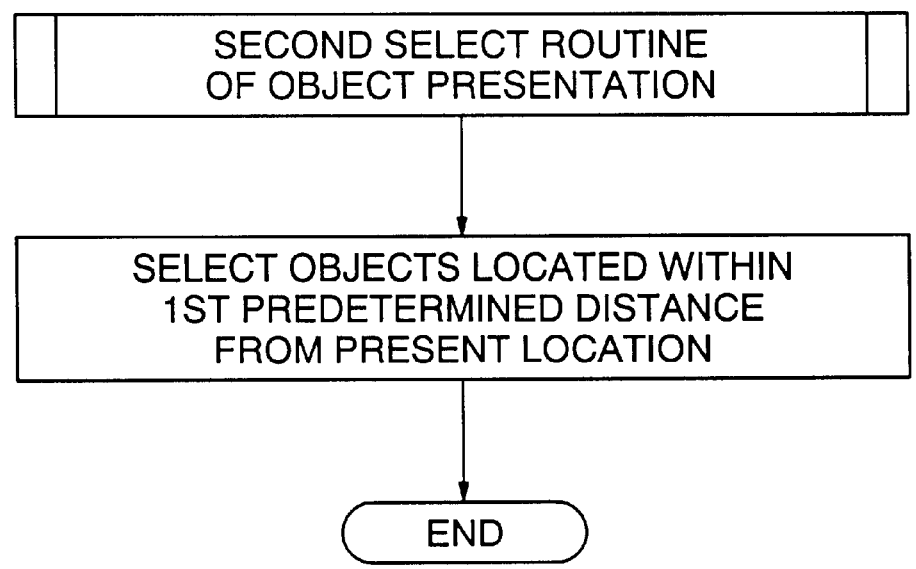
FIG. 6 is a flowchart showing a second select routine of the object presentation in S15 of FIG. 4B.

Next, the procedure goes to S15 in which a select routine of the object presentation is carried out. The select routine of the object presentation is shown in FIGS. 5 and 6. FIG. 5 shows a first select routine of the object presentation. In the first select routine, objects that are displayable on the display device 22, that is, that are located within the area shown in the display device 22, are selected from among the temporarily stored or updated information. FIG. 6 shows a second select routine of the object presentation. In the second select routine, objects that are located within a first predetermined distance (300 m) from the present location of the vehicle are selected from among the temporarily stored or updated information.

Referring back to FIG. 4B, the procedure goes to S16 in which the objects selected in S15 are displayed on the map on the display device 22.

The procedure then goes to S17 in which a select routine of the automatic presentation is carried out. The select routine of the automatic presentation is shown in FIGS. 7–13.

Figure 7:
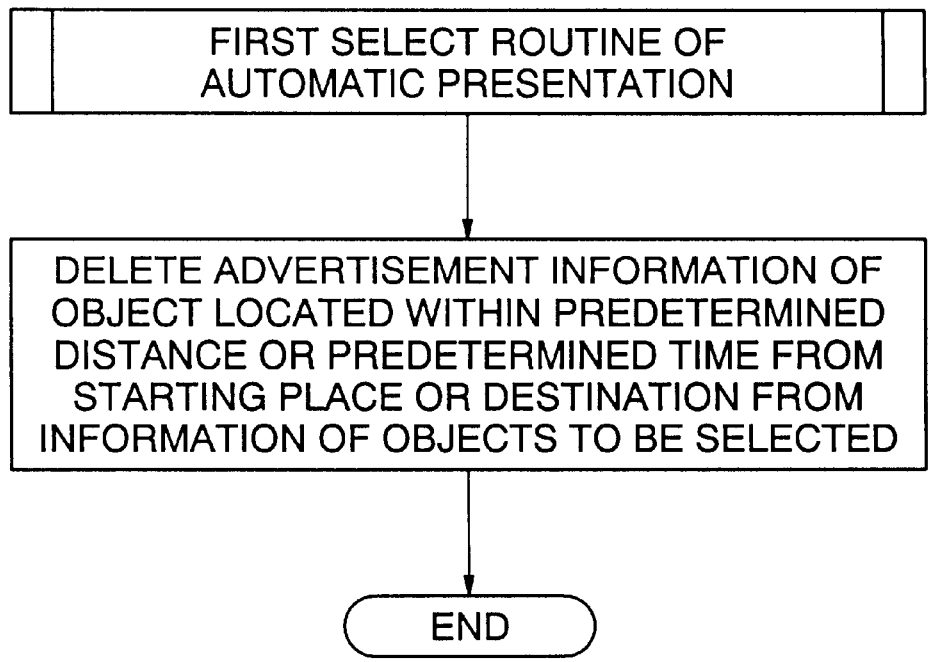
FIG. 7 is a flowchart showing a first select routine of the automatic presentation in S17 of FIG. 4B.

FIG. 7 shows a first select routine of the automatic presentation. In the first select routine of the automatic presentation, the advertisement information and/or the homepage information related to objects which are located within a predetermined distance or a predetermined time from the starting place or the destination is deleted from the object information to be selected. This is because such advertisement information and the homepage information are already well known to the drivers.

Figure 8:
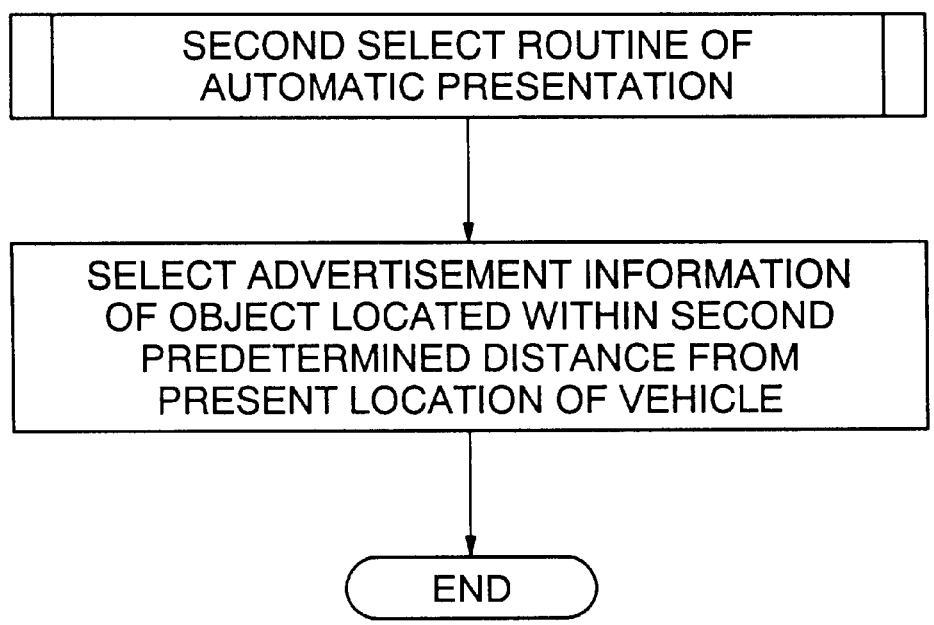
FIG. 8 is a flowchart showing a second select routine of the automatic presentation in S17 of FIG. 4B.

FIG. 8 shows a second select routine of the automatic presentation. In the second select routine of the automatic presentation, the advertisement information or the homepage information of objects located within a second predetermined distance (that is shorter than the above-mentioned predetermined distance) from the present location of the motor vehicle is selected. When the distance (the first predetermined distance) is relatively far from the present location of the vehicle, only object presentation suffices. When the distance (the second predetermined distance) is relatively near the present location of the vehicle, the automatic presentation of the object advertisement information and/or homepage information is useful to the driver.

Figure 9:
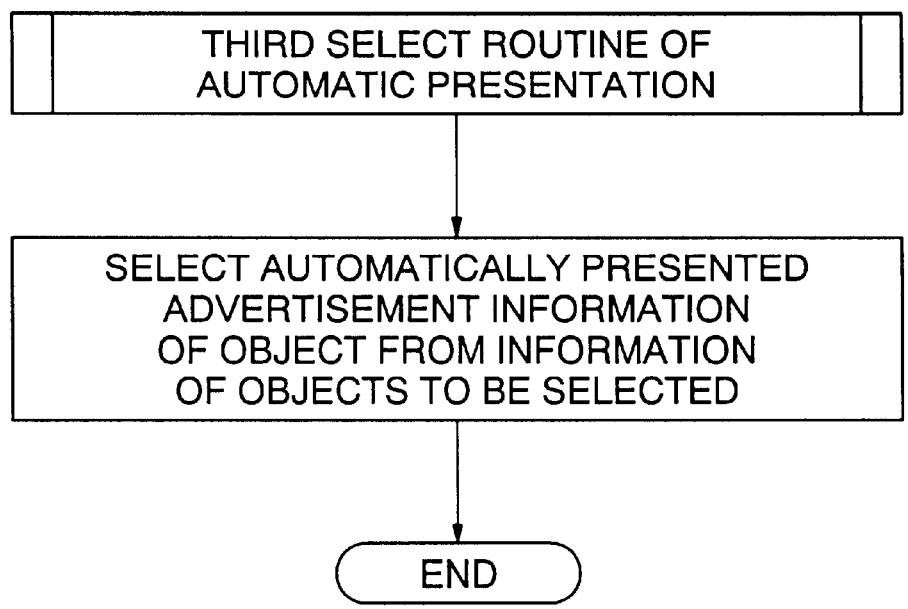
FIG. 9 is a flowchart showing a third select routine of the automatic presentation in S17 of FIG. 4B.

FIG. 9 shows a third select routine of the automatic presentation. In the third select routine of the automatic presentation, the automatically presented advertisement information and/or homepage information of the objects is deleted from the information of the objects to be selected. If the advertisement information and/or homepage information of the objects continue to be presented on the display device 22, the display screen becomes hard to view and such continued presentation of the objects is not useful to the drivers.

Figure 10:
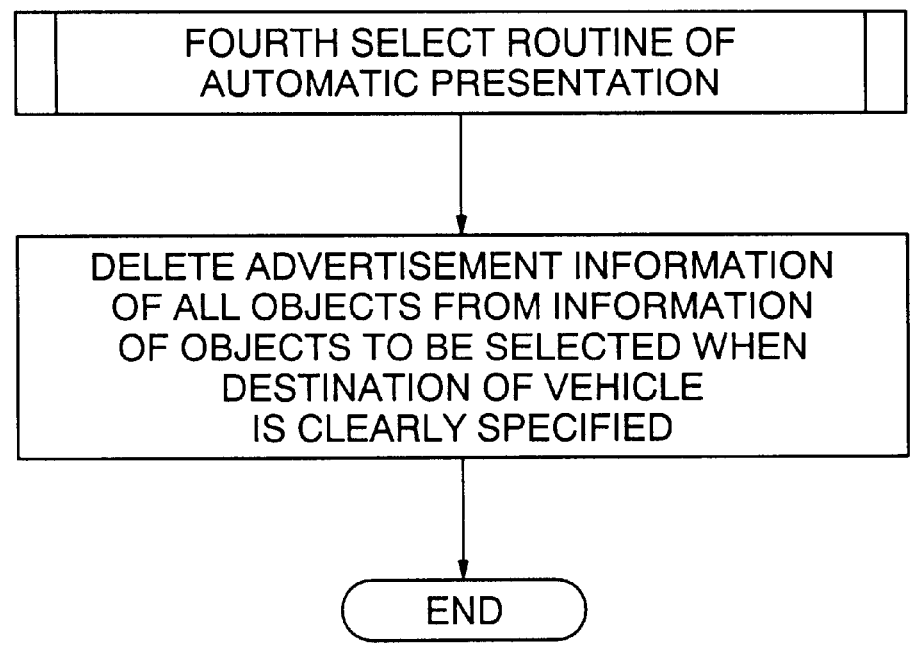
FIG. 10 is a flowchart showing a fourth select routine of the automatic presentation in S17 of FIG. 4B.

FIG. 10 shows a fourth select routine of the automatic presentation. In the fourth select routine of the automatic presentation, when the destination of the motor vehicle is clearly specified, such as when the destination is a specific hotel, the advertisement information and/or homepage information of all objects is deleted from the information of the objects to be selected. Further, in the fourth select routine, the advertisement information and/or homepage information that relates to the same item as that at the destination (the hotel in this case) is deleted from the information of the objects to be selected. This is because the drivers generally do not need advertisement information and the like when the destination is clearly specified, and the drivers clearly do not need the advertisement information and the like that relates to the same item as that at the destination.

Figure 11:
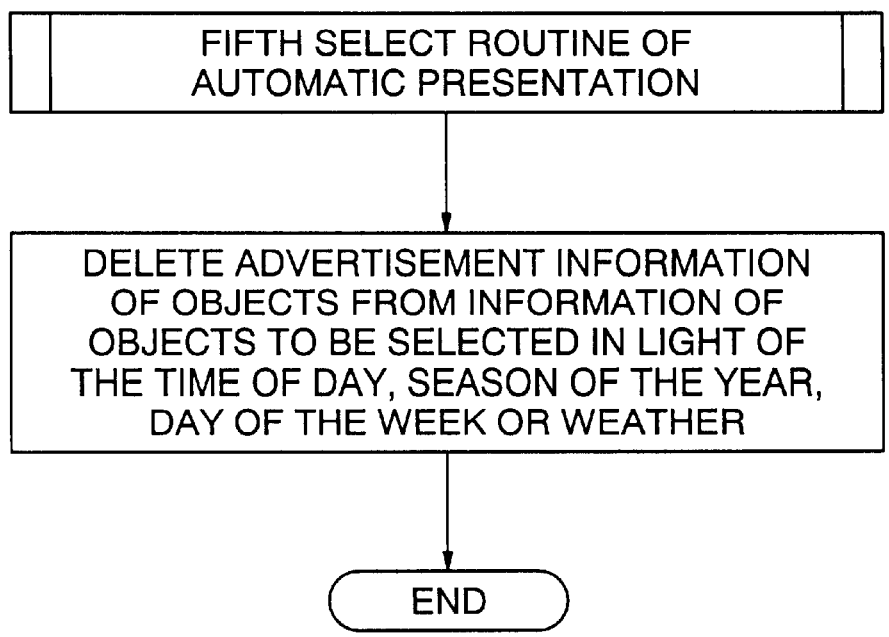
FIG. 11 is a flowchart showing a fifth select routine of the automatic presentation in S17 of FIG. 4B.

FIG. 11 shows a fifth select routine of the automatic presentation. In the fifth select routine of the automatic presentation, some of the advertisement information and/or homepage information of the objects is deleted from the information of the objects to be selected in light of the time of day, season of the year, day of the week or weather. This is because, for example, when the motor vehicle travels in the daytime, automatically presenting an object of a restaurant that is open only at night is meaningless.

Figure 12:
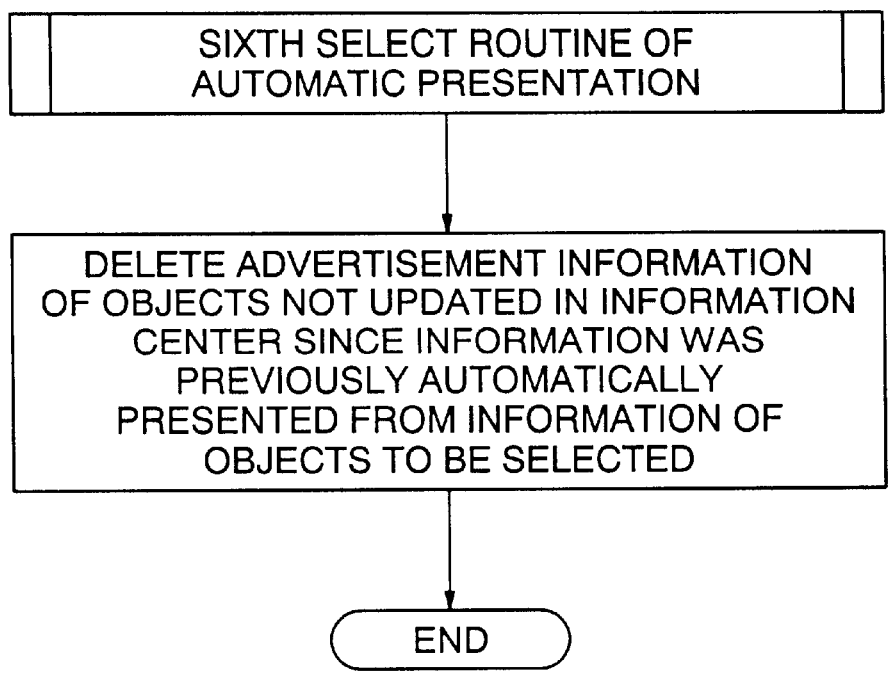
FIG. 12 is a flowchart showing a sixth select routine of the automatic presentation in S17 of FIG. 4B.

FIG. 12 shows a sixth select routine of the automatic presentation. In the sixth select routine of the automatic presentation, the advertisement information and/or homepage information of the objects that is not updated in the information center 2 since the information was previously automatically presented is deleted from the information of the objects to be selected. This is because the drivers have already taken in the previously presented information of the object and the non-updated information is therefore not useful to the drivers.

Figure 13:
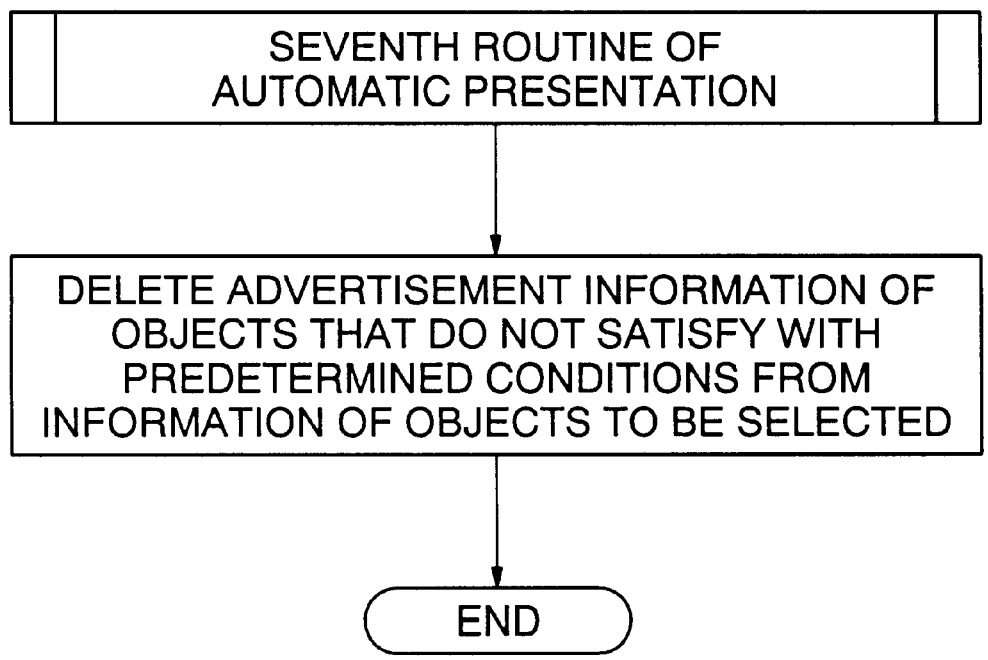
FIG. 13 is a flowchart showing a seventh select routine of the automatic presentation in S17 of FIG. 4B.

FIG. 13 shows a seventh routine of the automatic presentation. In the seventh select routine of the automatic presentation, some of the advertisement information and/or homepage information of the objects that does not satisfy predetermined conditions are deleted from the information of the objects to be selected. This may happen, for example, when the presence of a passenger in the motor vehicle in addition to the driver makes the automatic presentation of the advertisement information of the object unnecessary.

Referring back to FIG. 4B, the select routine of the automatic presentation is carried out in S17 using one or a combination of two or more of the select routines shown in FIGS. 7–13. Thereafter, the procedure goes to S18 in which the advertisement information and/or homepage information of the objects selected in S17 is superimposed on the map in the display device 22.

Next, it is determined whether or not the driver has selected some of the presented objects in S19 and it is further determined in S20 whether or not the advertisement information and/or homepage information of the selected objects is information that was selected in S17. If YES both in S19 and 20, the procedure goes to S21. In S21, the selected advertisement information and/or selected homepage information of the objects is superimposed on the map in the display device 22. As a result, the drivers are presented only with advertisement information and/or homepages relating to interesting and necessary objects, together with the map on the display device 22.

Next, if it is found in S1 that the navigation mode is not in effect, if the navigation mode is prohibited by the operation switch 26 in S13, if objects were not selected in S19, if the advertisement information and/or homepage information of the selected objects is not information that was previously selected in S20, or if the superimposed presentation on the map was completed in S21, the procedure goes to S22. In S22, it is determined whether or not a contract operation for changing the contract conditions of the navigation contract has been carried out. If YES in S22, the procedure goes to S23 in which a contract operation signal is transmitted through the Internet 12 to the information center 2 and then the content of the navigation contract is changed on-line.

The procedure then goes to S24 in which control operation routines other than the navigation mode are carried out.

Figure 14:
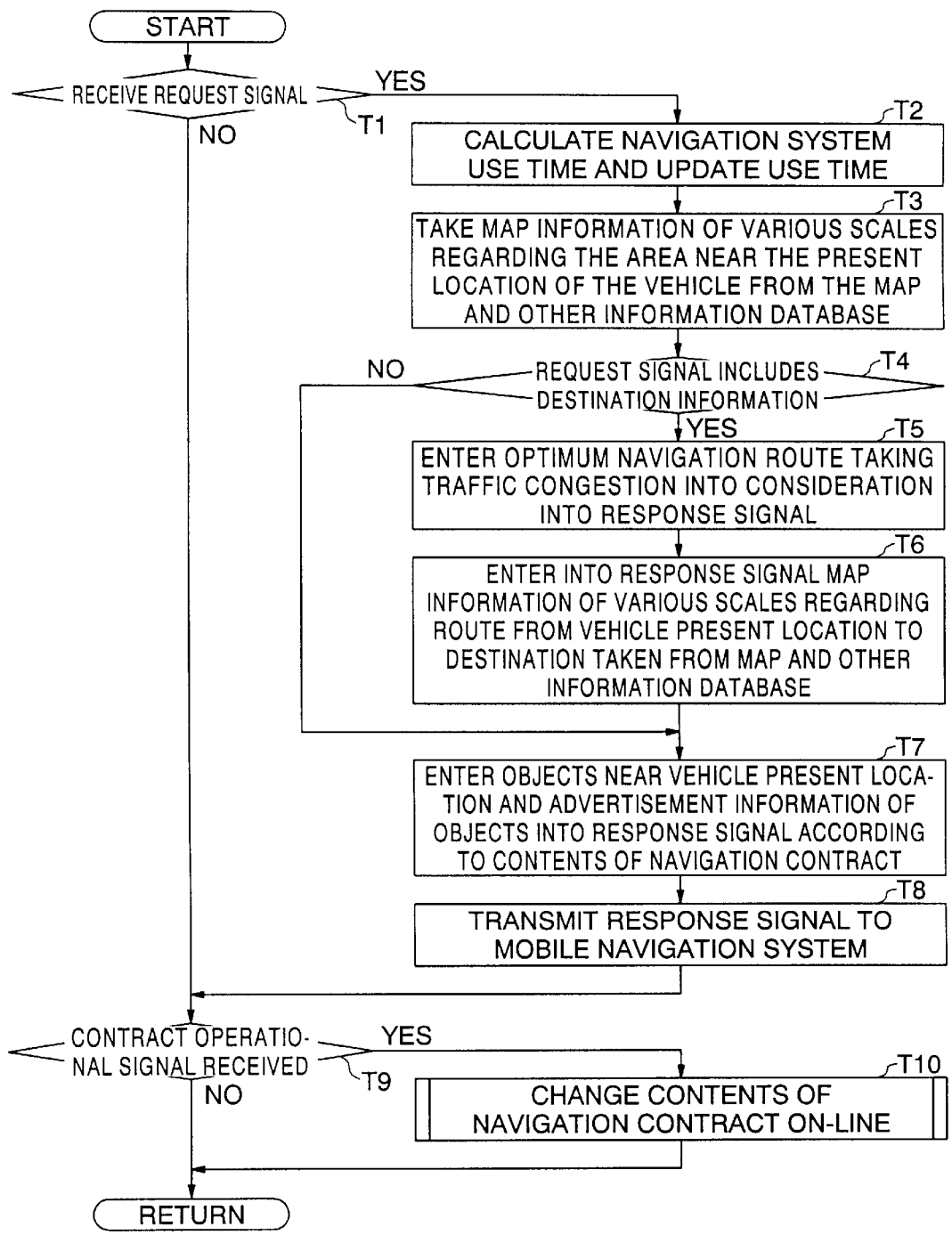
FIG. 14 is a flowchart showing a control operation of the map and other information providing system or an information center according to the embodiment of the present invention.

Next, the control operation of the host computer 6 of the information center 2 will be explained with reference to FIG. 14. It is determined in T1 whether or not the host computer 6 has received a request signal from the mobile navigation system 4. If YES in T1, the procedure goes to T2 in which the host computer 6 calculates the navigation system 4 use time and updates the use time stored in the storage device (not shown) by adding the calculated use time. The procedure then goes to T3 in which map information of various scales regarding the area near the present location of the vehicle is taken from the map and other information database 8 and entered into the response signal to be sent to the navigation system 4. At this time, the map information that was sent to the navigation system 4 within a predetermined time and the non-updated map information are not taken from the database 8, since such information is already stored in the storage device of the navigation system 4.

Next, it is determined in T4 whether the request signal the host computer received includes destination information. If YES in T4, the procedure goes to T5 in which the optimum navigation route taking traffic congestion and other information into consideration is entered into the response signal. Then, in T6, map information of various scales regarding the route from the present location of the vehicle to the destination are taken from the map and other information database 8 and entered into the response signal. Map information including information on communication interruption areas that was in advance taken from the database 8 and sent to the navigation system 4, and map information that was sent to the navigation system 4 within a predetermined time are not taken from the database 8.

Next, the procedure goes to T7. In T7, according to the contents of the navigation contract, objects near the present location of the vehicle or objects near both of the present location of the vehicle and the navigation route, advertisement information and/or homepage information of such objects are entered into the response signal. At this time, the map information that was sent to the navigation system 4 within a predetermined time and the non-updated map information are omitted. Further, voice data are entered into the response signal if included in the contract.

The procedure then goes to T8 in which the host computer 6 transmits the response signal to the mobile navigation system 4. At this time, if necessary, the host computer 6 transmits a signal regarding the present locations of other motor vehicles 44 and 46 (see FIG. 3), and the navigation system 4 therefore can recognize the present locations of specific motor vehicles.

Next, it is determined in T9 whether the host computer 6 has received a contract operation signal. If YES in T9, the procedure goes to T10 in which the contents of the navigation contract are changed on-line.

In the above-mentioned embodiment of the present invention, the mobile navigation system 4 receives the map information from the information center 2, stores the map information, and displays the stored map information on the display device 22. This embodiment of the present invention may be modified as follows.

The mobile navigation system 4 may receive the map information from the information center 2 and store coordinates of the location of the map information in the storage device 20. The coordinates of the location of the map information are the latitude and longitude of the center point of the map coordinates for specifying the map coordinates. If necessary, the navigation system 4 thereafter transmits the coordinates of the location of the map information to the information center 2 and then again receives the map information corresponding to the coordinates of the location thereof from the information center 2. The navigation system 4 updates the map information with the freshly received map information and displays the updated map information on the display device 22.

Figure 15A:
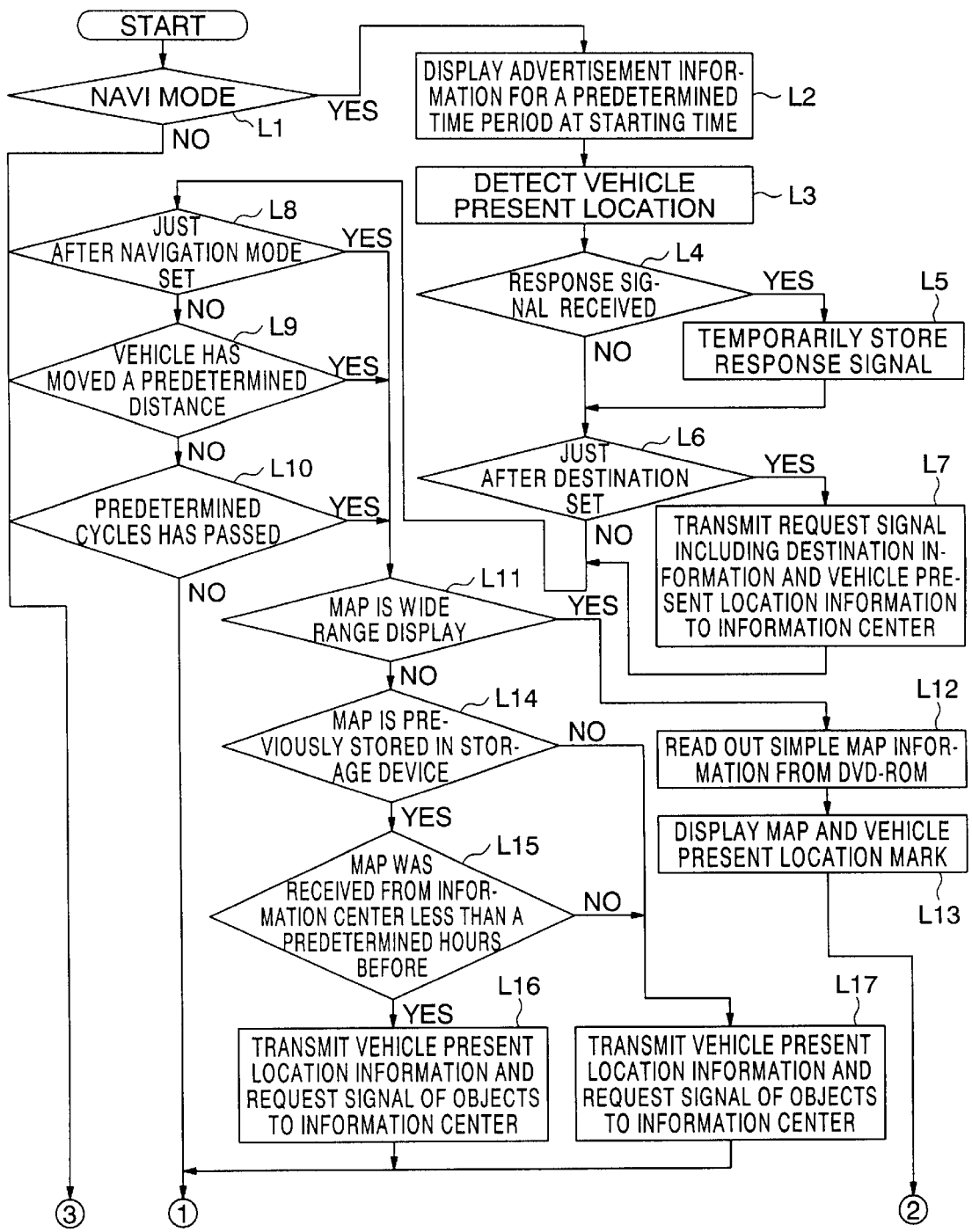
FIG. 15 is a flowchart showing the sequence of control operations of the mobile navigation system according to another embodiment of the present invention.
Figure 15B:
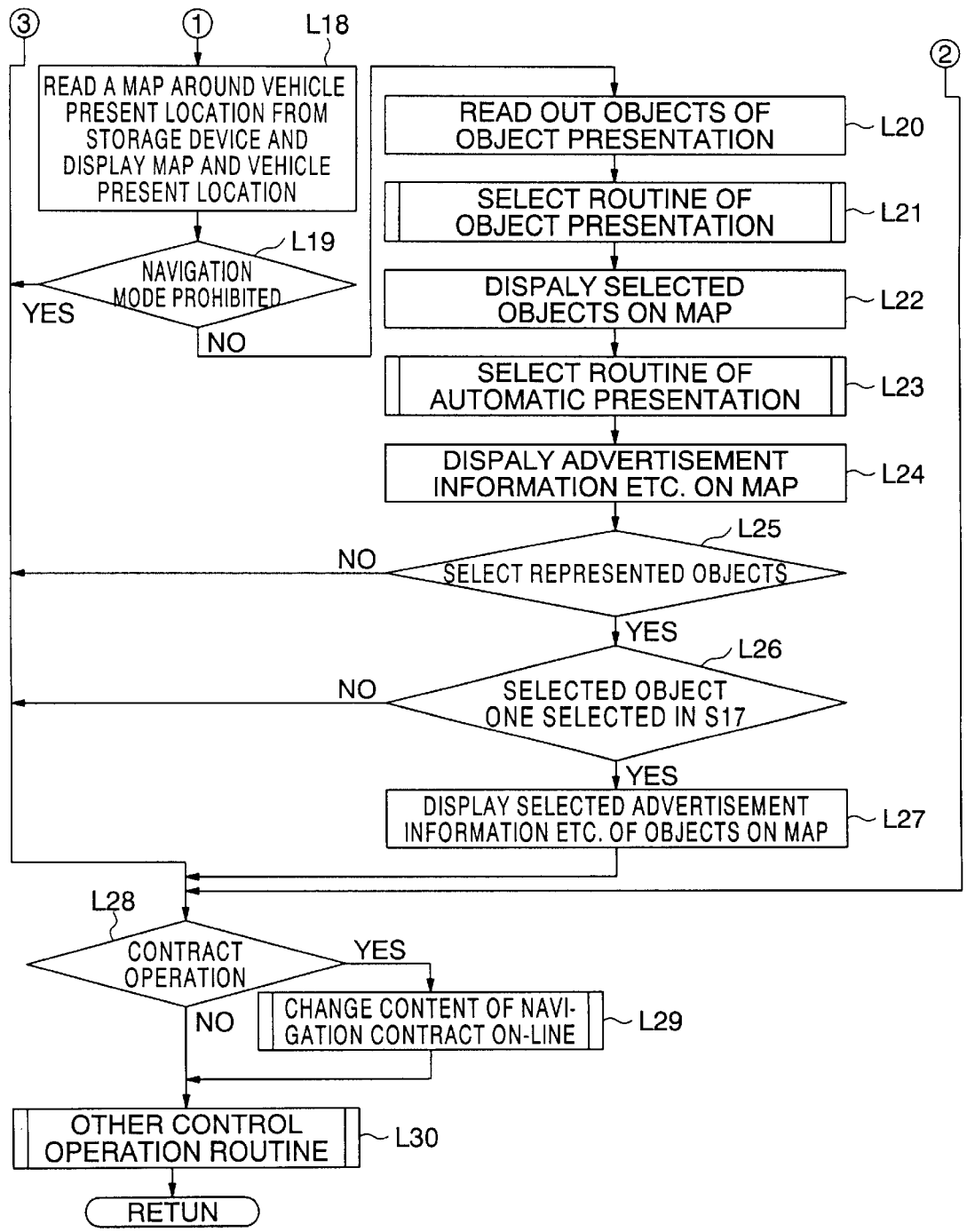

Next, another embodiment of the present invention will be explained with reference to FIGS. 15A and 15B and 16. Reference symbols L and M in FIGS. 15A and 15B and 16 indicate steps of the control operations.

First, the control operation of the CPU 16 of the mobile navigation system 4 will be explained with reference to FIGS. 15A and 15B. It is determined in L1 whether or not the driver has set a navigation mode by operating the operation switch 26. If YES in L1, the procedure goes to L2 in which the advertisement information is displayed on the display device 22 for a predetermined time period at the starting time of the navigation system 4 if the "CM Display at NAVI Starting Time" is selected in the navigation contract. The procedure then goes to L3 in which the present location of the motor vehicle is detected using the GPS receiver 30, the vehicle speed sensor 32, the gyro sensor 34, map-matching and the like.

Next, it is determined in L4 whether or not the navigation system 4 has received a response signal from the information center 2. If YES in L4, the procedure goes to L5 in which the navigation system 4 temporarily stores the response signal in the storage device 20. The response signal, which is temporarily stored, includes map information, navigation information, object information, advertisement information and/or homepage information. The map information in the storage device 20 is updated with the temporarily stored information. If the amount of the updated information becomes greater than the storage capacity of the device 20, the older information is deleted. Thus, the load on the storage device 20 of the mobile navigation system 4 can be reduced.

Next, it is determined in L6 whether or not it is just after the driver set his destination. If YES in L6, the procedure goes to L7 in which the navigation system 4 transmits a request signal including the destination information and the vehicle present location information together with information regarding the navigation system 4 use time to the information center 2.

Next, it is determined in L8 whether or not it is just after the navigation mode was set. If YES in L8, the procedure goes to L9 and L10. If the motor vehicle has moved a predetermined distance (L9) or a predetermined number of cycles has passed (L10), the procedure goes to L11. In L11, it is determined whether the scale of the map is greater than a predetermined value, that is, the map is a wide-range display. If it is determined that the scale of the map is greater than a predetermined value in L11, the procedure goes to L12. In L12, the navigation system 4 reads out simple map information from the DVD-ROM 24, then reads out a map of specified scale for the area near the present location of the vehicle, and in L13 displays both the map and the vehicle present location mark on the display device 22.

On the other hand, if it is determined that the scale of the map is not greater than the predetermined value in L11, the procedure goes to L14. In L14, it is further determined whether the map to be displayed is one that was previously stored in the storage device 20 as the map received from the information center 2. If YES in L14, the procedure goes to L15 in which it is determined whether the stored map was received from the information center 2 less than a predetermined number of hours before. If YES in L15, the procedure goes to L16 in which the navigation system 4 transmits vehicle present location information and an object request signal together with information regarding the navigation system 4 use time to the information center 2.

If NO in both L14 and L15, the procedure goes to L17 in which the navigation system 4 transmits a request signal including vehicle present location information together with information regarding the navigation system 4 use time to the information center 2.

Next, the procedure goes to L18 in which the navigation system 4 reads a map of specified scale of the area around the vehicle present location from the storage device 20, and displays both the map and the vehicle present location mark 36 on the display device 22. If the map information to be displayed has not been updated, this fact is shown on the display device 22 before the map is displayed.

Figure 4A:
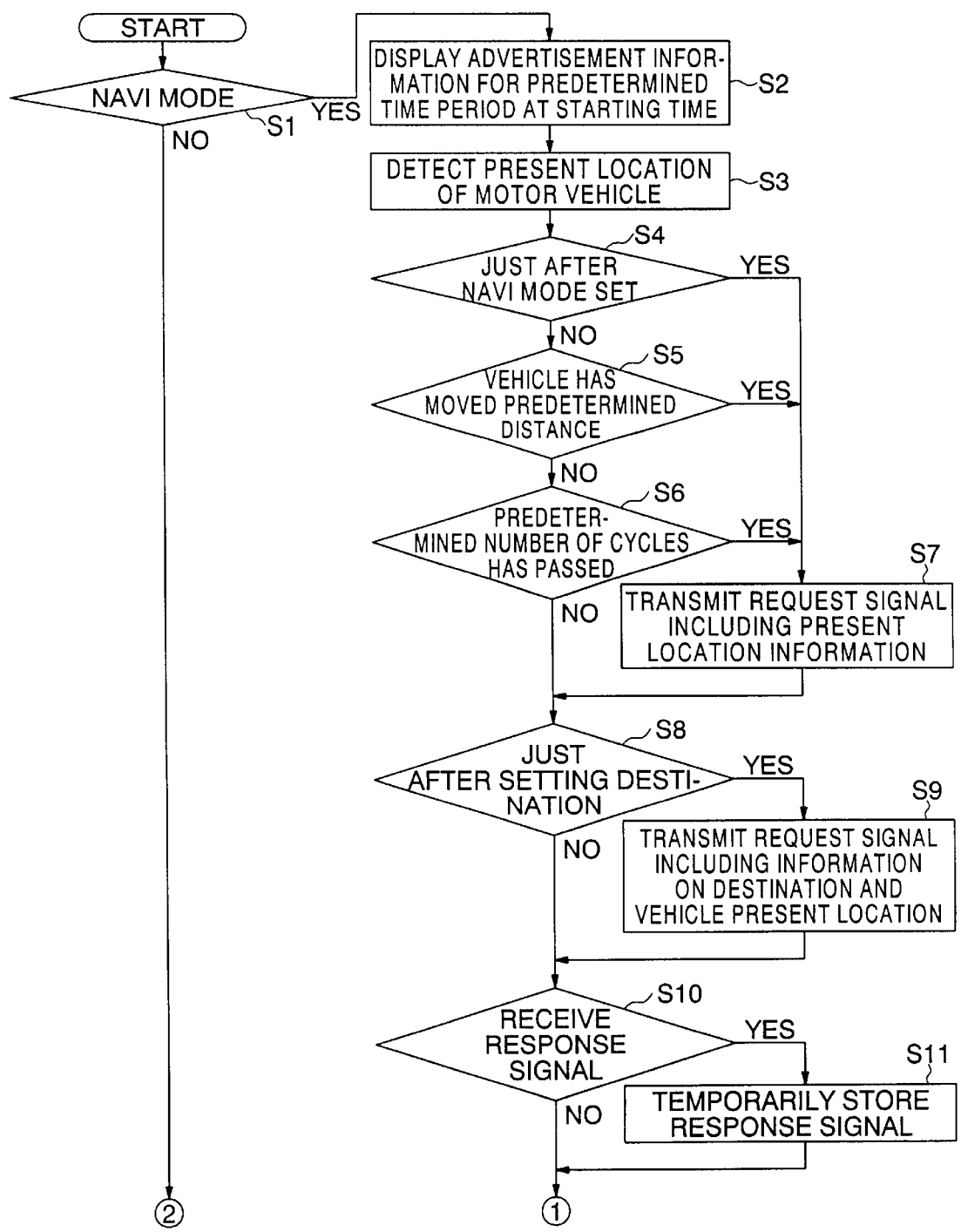

The following steps L19–L30 are the same as steps S13–S24 in FIGS. 4A and 4B. Therefore, these steps are not explained here.

Next, the control operation of the host computer 6 of the information center 2 will be explained with reference to FIG. 16. It is determined in M1 whether or not the host computer 6 has received a request signal from the mobile navigation system 4. If YES in M1, the procedure goes to M2 in which the map information of various scales regarding the area near the present location of the vehicle are taken from the map and other information database 8 and entered into the response signal to be sent to the navigation system 4. At this time, the map information that was sent to the navigation system 4 within a predetermined time and non-updated map information are not taken from the database 8, since such information are already stored, that is, temporarily stored or updated, in the storage device of the navigation system 4.

Next, it is determined in M3 whether the request signal the host computer 6 received includes destination information. If YES in M3, the procedure goes to M4 in which the optimum navigation route taking traffic congestion and other information into consideration is entered into the response signal. Then, in M5, map information of various scales regarding the route from the present location of the vehicle to the destination are taken from the map and other information database 8 and entered into the response signal. Map information including information on communication interruption areas that was in advance taken from the database 8 and sent to the navigation system 4, and map information that was sent to the navigation system 4 within a predetermined time and was not updated are not taken from the database 8. In a communication interruption area, map information stored in the DVD-ROM 24 may be used instead of map information taken in advance from the database 8.

Next, it is determined in M6 whether or not an object request signal was received. If YES in M6, the procedure goes to M7 in which, according to the contents of the navigation contract, objects around the vehicle present location or objects around the vehicle present location and near the navigation route, and advertisement information and/or homepage information relating to the objects are entered into the response signal. At this time, the map information that was sent to the navigation system 4 within a predetermined time and was not updated are not taken from the database 8. Further, voice data are also entered into the response signal according to the contents of the navigation contract.

Next, the procedure goes to M8 in which the host computer 6 calculates the navigation system 4 use time and updates the use time stored in the storage device (not shown) by adding the calculated use time.

Next, the procedure goes to M9 in which the host computer 6 transmits the response signal to the mobile navigation system 4. At this time, if necessary, the host computer 6 transmits a signal regarding the present locations of other motor vehicles 44 and 46 (see FIG. 3), and the navigation system 4 therefore can recognize the present locations of the specific motor vehicles.

Next, it is determined in M10 whether the host computer 6 has received a contract operation signal. If YES in M10, the procedure goes to M11 in which the contents of the navigation contract are changed on-line.

Figure 16:
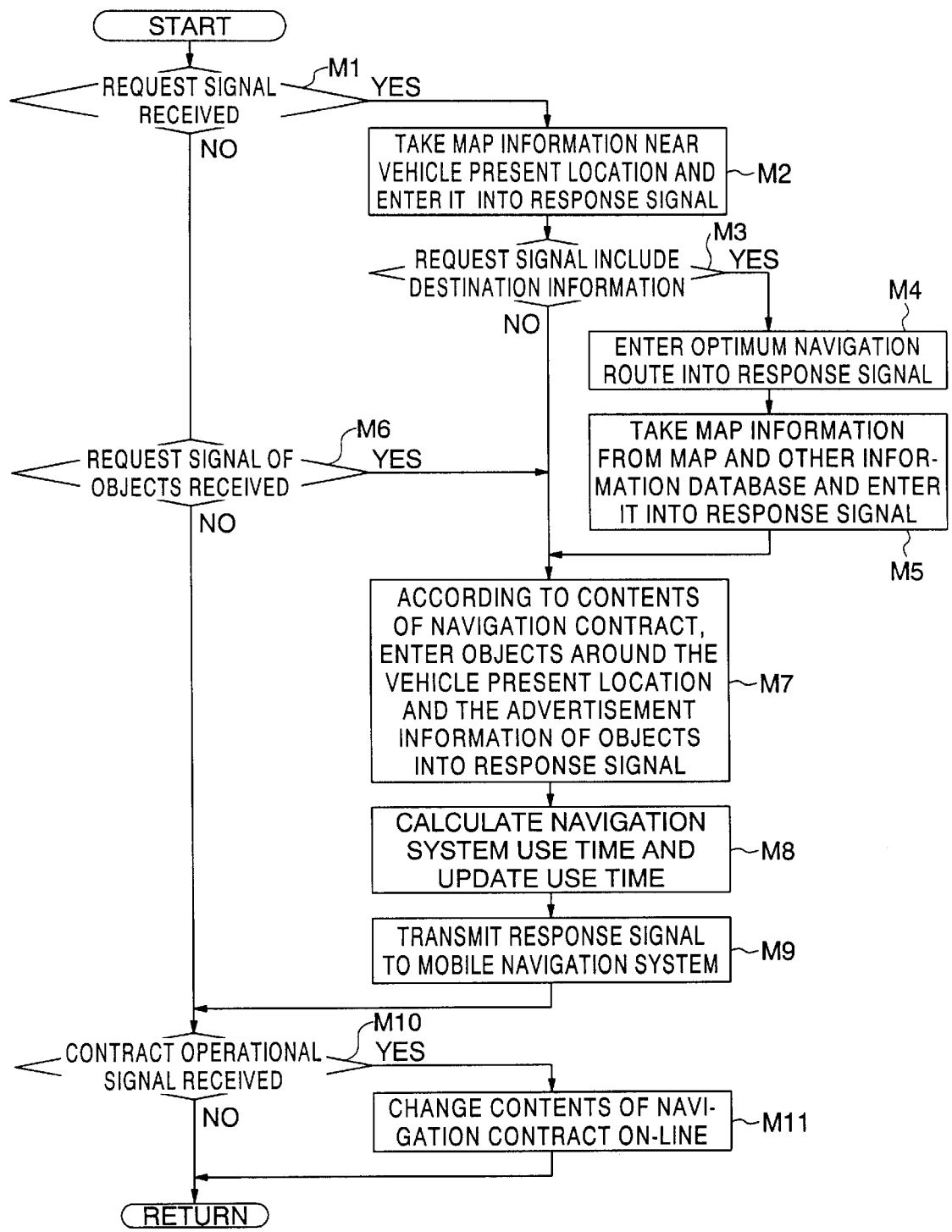
FIG. 16 is a flowchart showing the sequence of control operations of the map and other information providing system or an information center according to another embodiment of the present invention.

According to the embodiment in FIGS. 15 and 16, when a map having a scale grater than a predetermined value is to be displayed, that is, a wide-area map is to be displayed, the information center 2 does not deliver map information to the mobile navigation system 4. Instead, the navigation system 4 displays the simple map information stored in the DVD-ROM 24 on the display device 22. As a result, the problem of a lot of displayed advertisement information making the display hard to view can be avoided.

On the other hand, when a map of a scale equal to or less than the predetermined value is to be displayed, that is, a small-area map is to be displayed, the map information is not delivered from the information center 2 to the mobile navigation system 4 even though the map information was delivered to the navigation system 4 within a predetermined time. However, the objects, the advertisement information, and/or the homepage information are delivered from the information center 2 to the mobile navigation system 4 according to the request signal of the navigation system 4, since such information might be updated in the information center.

Further, when a map of a scale equal to or less than the predetermined value is to be displayed, if the map information has never been delivered from the information center 2 to the mobile navigation system, or if the map information has not been delivered within the predetermined time, the information center 2 delivers the map information to the mobile navigation system 4. At this time, the information center 2 of course delivers the objects, advertisement information, and/or homepage information.

The storage device 20 of the mobile navigation system 4 stores the received information including the objects, advertisement information, and/or homepage information as long as its memory capacity permits. If the device 20 becomes full of such information, the information is deleted starting from the oldest.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. A map and other information distribution system for distributing map information and information other than map information, comprising:
    an information center including a database storing map information and information other than map information, and a transmitter for transmitting at least said map information under a fee-based navigation contract concluded beforehand; and
    a mobile navigation system including a location detector for detecting a present location of a mobile unit, a receiver for receiving at least the map information from the information center under the fee-based navigation contract concluded beforehand, and a controller for displaying the map information around the present location of the mobile unit on a display device;
    wherein the information other than map information includes advertisement information, the controller superimposes the advertisement information on the map information around the present location of the mobile unit on the display device, and the fee in the navigation contract is reduced when the advertisement information is selected.

2. A map and other information distribution system according to claim 1, wherein the mobile navigation system further comprises a connecting device for connecting with a communication network, and when the mobile navigation system is connected with the information center through the communication network the controller enables conclusion of a navigation contract or change in the selection of various items of information other than map information.

3. A map and other information providing system for transmitting map information and information other than map information to a mobile navigation system, comprising:
    a database storing map information and information other than map information; and
    a transmitter for transmitting at least said map information to the mobile navigation system under a fee-based navigation contract concluded beforehand;
    wherein the information other than map information includes various items, the various items of information other than map information can be specified in the navigation contract for distribution from said system to the navigation system, and the fee specified in the navigation contract is changed based on the selected items of information other than map information
    wherein the information other than map information includes advertisement information as one of the various items thereof, and the fee in the navigation contract is reduced when the advertisement information is selected.

4. A mobile navigation system comprising:
    a location detector for detecting a present location of a mobile unit;
    a receiver for receiving at least map information from a remote information center under a fee-based navigation contract concluded beforehand;
    a controller for displaying the map information around the present location of the mobile unit on a display device; and
    said receiver further receiving information other than map information that includes various items, the various items of information other than map information being able to be selected in the navigation contract for distribution from the information center to the navigation system, the fee specified in the navigation contract being changed based on the selected items of information on the other than map information.

5. A mobile navigation system according to claim 4, wherein said receiver receives the map information from the information center when setting the destination of a motor vehicle or requesting the map information to the information center.

6. A mobile navigation system according to claim 4, wherein said controller stores the map information or coordinates of a location of the map information received from the information center stored in the map storage device, and displays the stored map information on the display device or displays other map information freshly received from the information center based on the coordinates of the location of the map information on the display device.

7. A mobile navigation system according to claim 4, wherein the system further comprises a connecting device for connecting with a communication network, and when the mobile navigation system is connected with the information center through the communication network the controller enables conclusion of a navigation contract or change in the selection of various items of information other than map information.

8. A mobile navigation system according to claim 4, wherein the advertisement information includes various items that can be further respectively selected in the navigation contract for distribution from the information center to the navigation system, the respectively selected items of the advertisement information are superimposed on the map information around the present location of the mobile unit on the display device, and the fee in the navigation contract is reduced based on the respectively selected items of the advertisement information.

9. A mobile navigation system according to claim 4, wherein various delivery time periods of the advertisement information can be further selected in the navigation contract for distribution from the information center to the navigation system, and the fee in the navigation contract is increased from the reduced fee when the selected delivery time period is relatively short.

10. A mobile navigation system according to claim 4, wherein displaying a superimposed advertisement information when the motor vehicle approaches an object related to the selected item of the advertisement information can be further selected in the navigation contract, and the fee in the navigation contract is less reduced when the displaying a superimposed advertisement information is selected.

11. A mobile navigation system according to claim 4, wherein providing an information about objects related to the advertisement information by a voice announcement can be further selected in the navigation contract, and the fee in the navigation contract is less reduced when the providing an information by a voice announcement is selected.

12. A mobile navigation system according to claim 4, wherein the fee in the navigation contract is more reduced when a delivery time of the advertisement information for distribution from the information center to the navigation system is equal to or more than a predetermined time, and the fee in the navigation contract is increased from the reduced fee when a delivery time of the advertisement information for distribution from the information center to the navigation system is less than the predetermined time.

13. A mobile navigation system comprising:
 a location detector for detecting a present location of a mobile unit;
 a receiver for receiving at least map information from a remote information center under a fee based navigation contract concluded beforehand;
 a controller for displaying the map information around the present location of the mobile unit on a display device;
 a map storage device for storing map information; and
 said controller displaying the map information stored in the map storage device when the map information is not received from the information center.

14. A mobile navigation system according to claim 13, wherein even when the receiver receives the map information from the information center, said controller does not update the map information stored in the map storage device.

15. A mobile navigation system according to claim 13, wherein when the receiver can not receive the map information from the information center, said controller gives an alarm indicating no reception of information and displays the map information stored in the map storage device.

16. A computer readable storage medium having a navigation program stored thereon representing instructions executable by a mobile navigation system that receives map information from an information center, the computer readable storage medium comprising:
 instructions for detecting a present location of a mobile unit;
 instructions for receiving at least the map information from a remote information center under a fee-based navigation contract concluded beforehand;
 instructions for showing the map information around the present location of a mobile unit on a display device;
 instructions for further receiving information other than the map information that includes advertisement information from the information center under the navigation contract; and
 instructions for superimposing advertisement information on the map information around the present location of the mobile unit on the display device,
 wherein the fee in the navigation contract is reduced when the advertisement information is selected.

17. A navigation program representing instructions executable by a mobile navigation system that receives map information from an information center, the navigation program comprising:
 instructions for detecting a present location of a mobile unit;
 instructions for receiving at least the map information from a remote information center under a fee-based navigation contract concluded beforehand;
 instructions for showing the map information around the present location of a mobile unit on a display device;
 instructions for further receiving information other than map information that includes advertisement information from the information center under the navigation contract; and
 instructions for superimposing advertisement information on the map information around the present location of the mobile unit on the display device,
 wherein the fee in the navigation contract is reduced when the advertisement information is selected.

* * * * *